United States Patent [19]

Reeve

[11] Patent Number: 4,847,769
[45] Date of Patent: Jul. 11, 1989

[54] AUTOMATED VEHICLE DRIFT CORRECTION

[75] Inventor: Peter J. Reeve, Warwickshire, England

[73] Assignee: The General Electric Company, p.l.c., United Kingdom

[21] Appl. No.: 816,207

[22] Filed: Jan. 6, 1986

[30] Foreign Application Priority Data

Jan. 16, 1985 [GB] United Kingdom ............... 8501012

[51] Int. Cl.⁴ .............................................. G06F 15/50
[52] U.S. Cl. ................................ 364/424.02; 180/168; 364/447
[58] Field of Search ............... 364/400, 449, 446, 424, 364/424.02, 447, 453, 454; 342/80, 95, 107; 901/1; 180/167, 168

[56] References Cited

U.S. PATENT DOCUMENTS

| | | | |
|---|---|---|---|
| 3,683,378 | 8/1972 | Polhemus | 342/107 X |
| 4,454,583 | 6/1984 | Schneiderhan et al. | 364/449 |
| 4,700,302 | 10/1987 | Arakawa et al. | 364/424 |
| 4,727,492 | 2/1988 | Reeve et al. | 364/450 X |

FOREIGN PATENT DOCUMENTS

| | | |
|---|---|---|
| 0050101 | 1/1982 | European Pat. Off. . |
| 0077985 | 10/1982 | European Pat. Off. . |
| 2801045 | 3/1977 | Fed. Rep. of Germany . |
| 2375579 | 10/1977 | France . |
| 2526181 | 4/1982 | France . |
| 2143395 | 2/1985 | United Kingdom . |
| 2158965 | 11/1985 | United Kingdom . |

Primary Examiner—Thomas H. Tarcza
Assistant Examiner—Tod Swann
Attorney, Agent, or Firm—Kirschstein, Ottinger, Israel & Schiffmiller

[57] ABSTRACT

An automated vehicle includes a navigation system which carries out a dead reckoning calculation of the vehicle's position based on inputs from sensors on the motion of a steering wheel in the preceding time interval, $\Delta t$. Parameters of the system including the heading angle, the spatial position x,y the angular drift in the steering angle $\alpha$, a crabbing angle $\beta$ and a variation $l_{dm}$ in steering wheel radius are updated by the addition of the product of a Kalman gain calculated by computer and an error signal produced each time an observation is made by laser bearing finding equipment on the vehicle.

9 Claims, 3 Drawing Sheets

AUTOMATED VEHICLE DRIFT CORRECTION

BACKGROUND OF THE INVENTION

1. Field of the Invention

The present invention relates to navigation systems particularly for automated vehicles which move in accordance with programmed control without the use of guidance wires or tracks.

2. Description of Related Art

Navigation control for automated vehicles systems are described in GA-A-2 143 395 and GB-A-2 158 965. In the system of GA-A-2 158 965 the path of the vehicle is determined by a dead reckoning system which calculates the linear and angular movement of the vehicle during a short time interval from the angle of rotation and the steering angle of a guidance wheel, for example a castor wheel, on the vehicle. In this way the system predicts its own position at any time. The position so predicted by the dead reckoning system is checked at intervals by taking a bearing to a retro-reflector of known position using a scanning laser source on the vehicle. The positional error, detected by means of such a bearing operation, is then used to correct the position information by means of a filter.

This system suffers certain disadvantages, because of inherent errors in the measurement of the linear distance and angle through which the vehicle has moved within each time interval. These errors arise as a result of variations in the castor wheel radius caused, for example, by wear, inaccuracies in the measurement of the steering angle of the castor wheel during each time interval, and because the vehicle may tend to move with a "crabbing" motion.

SUMMARY OF THE INVENTION

The present invention provides a navigation system for a vehicle having steering means, and means for controlling the steering means in response to a stored programme, said navigation system comprising:

means for determining the linear distance travelled and the amount of rotation about a predetermined centre of rotation during each of a plurality of successive time intervals, means for producing an updated estimate of the heading angle ($\psi$) and the spatial position (x,y) of the vehicle within a predetermined co-ordinate frame of reference, means for producing a bearing and/or range to a target at a known predetermined position within the reference frame, and deriving an error signal as the difference between the actual measured bearing or range and the bearing or range that should have been measured if the vehicle was actually at the estimated position with the estimated heading, and filter means for producing a corrected estimated value of the heading angle, spatial position (x,y) of the vehicle and also of one or more further parameters of the vehicle in response to said error signal.

In the prior art system the error signal derived by carrying out a bearing was used only to correct the heading and spatial position data. Now, in accordance with the present invention, the error signal is also used to correct other parameters such as parameters used to determine the linear distance travelled and the amount of rotation of the vehicle during each time interval, and/or parameters used in converting the linear distance travelled to movements in the spatial position of the vehicle. Where the linear distance and rotation are determined by sensors for measuring the steering angle, and the angle through which the castor wheel rotates in the time interval, additional parameters that can be corrected by the filter means are the offset in the measurement of the steering angle, the offset in the measurement of the angle of rotation of the wheel during each time interval, and the error in the radius of the steering wheel. A further source of error may arise as a systematic angular offset between the estimate of heading direction of the vehicle and the actual direction of movement. Such an error can arise because of a "crabbing" effect in which the vehicle moves consistently to one side of the heading direction. This can be caused by mechanical misalignments of the chassis, axle or wheels, for example, or torque mismatches at the driving wheels of the vehicle. This type of error may also arise due to misalignment in the apparatus used for producing the bearing or range to a target which can also produce an apparent crabbing motion. This systematic angular error as a result of the combination of these effects is referred to here as the "crabbing" angle.

By continually using the error signal to effectively recalibrate the determining means and estimate producing means each time a bearing is taken, not only is the exact position of the vehicle effectively corrected so that the control means can cause drive and steering means to make the necessary corrections to ensure correct route following, but also there will be a continued increase in accuracy of the position of the vehicle as measured by itself, since the determining means and estimate producing means will become more accurate after each successive bearing is taken. The described system can also dynamically correct for drifts in the sensors used to measure the angles, wear of the steering wheel and drifts in the crabbing angle.

BRIEF DESCRIPTION OF THE DRAWINGS

An embodiment of the invention will now be described, by way of example only, with reference to the accompanying diagrammatic drawings, in which.

DETAILED DESCRIPTION OF THE PREFERRED EMBODIMENT

Automated vehicles which can control their own movements in accordance with a stored programme so that the vehicle follows a programmed path have been proposed. Such a vehicle is described in GB-A-2 143 395 and GB-A-2 158 965 to which reference may be made for a description of how a vehicle can fix its own position and be programmed for route finding respectively. It will be appreciated that the programmed control must make appropriate steering and speed demands on the vehicle so that it follows the required path within programmed constraints, such as the maximum vehicle speed and available path width. The present invention is concerned with the navigation system which allows the vehicle to estimate its own position and correct those estimates by taking bearings on or ranges or a combination of bearings on and range to targets at known positions. Only this aspect of the control system will be described in detail herein.

Figure 1:
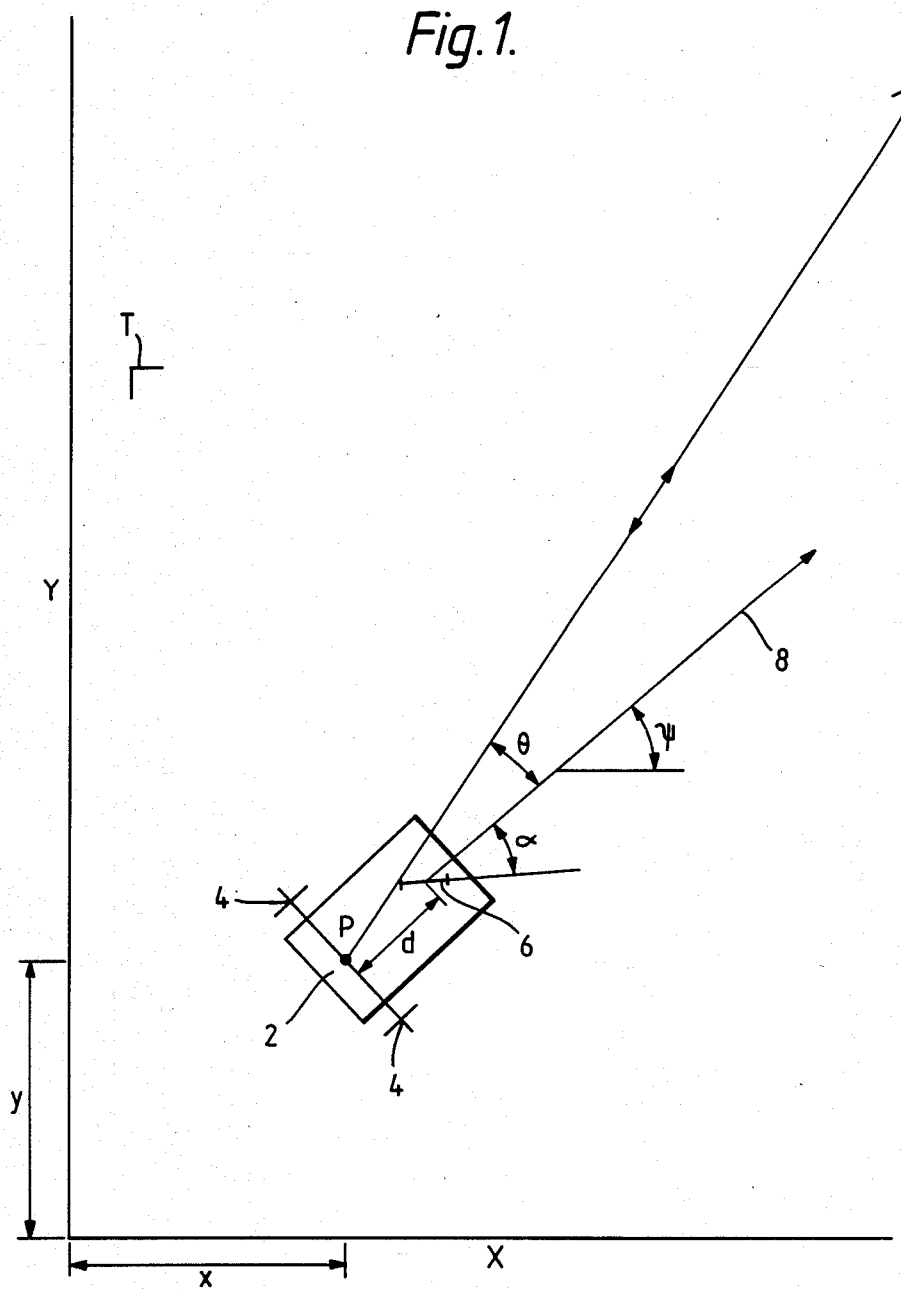
FIG. 1 is a diagrammatic representation of a vehicle equipped with a navigation system in accordance with the present invention.

FIG. 1 illustrates a vehicle 2 located in an arbitrary Cartesian co-ordinate frame of reference, which will be referred to as the factory frame as it generally represents the working area of a factory in which the vehicle is constrained to move. The position of an arbitrary point P on the vehicle 2 is defined in terms of its co-ordinates (x,y) in the factory frame. The arbitrary point P is, for example, the mid point of a shaft carrying a pair of drive wheels 4 which are connected to a drive motor (not shown). A steering wheel 6, which is a castor wheel is mounted centrally at the forward part of the vehicle a distance, d, from the point P. The castor wheel 6 can be pivoted about a vertical axis to give a desired steering angle, $\alpha$, between the vertical plane of the castor wheel 6 and a heading vector 8, which represents the direction in which the vehicle is travelling. A castor wheel is not the only possible form of steering arrangement for such a vehicle. For example, steering may be provided by differentially driving a pair of wheels one on each side of the vehicle. The following description will assume steering by means of a castor wheel 6.

The heading vector 8 defines an angle $\psi$ with the X axis of the factory frame.

In order that the vehicle may confirm its position, a number of targets T, for example retro-reflectors, are distributed around the factory frame. The vehicle 2 is provided with laser bearing finding equipment (not shown) which is conveniently located at the point P on the vehicle. A suitable form of bearing finding equipment is described in GB-A-2 143 395. In some applications it may be more appropriate to measure the range to a target rather than a bearing. This may be appropriate, for example, if the targets have to be at relatively large distances from the vehicle. In this case greater accuracy may be obtainable by measuring range. In other embodiments both the bearing and range may be measured, i.e. both polar co-ordinates of the target in relation to the vehicle. In the following we have assumed that bearings are used but it will be appreciated that the system could readily be adapted to use range measurements in addition or as an alternative.

The bearing finding equipment emits a beam of laser light towards a rectro-reflector T. When the beam is accurately targeted on the retro-reflector, the bearing finder receives back the reflected laser light energy. The bearing $\theta$ between the direction in which the laser beam is transmitted and the heading vector 8 is noted by the control system. The control system of the vehicle is programmed so that the bearing equipment produces a bearing to a retro-reflector T whenever a target is sensed by the equipment. Thus such bearings are available at intervals during operation of the vehicle. Since the control system continuously calculates its own position and contains in its memory a map of the factory frame, the expected bearing $\hat{\theta}$ of an appropriate rectro-reflector can be calculated. However, the actual bearing will generally be somewhat different from the calculated value of $\hat{\theta}$. Accordingly, the bearing apparatus provides an error signal equal to $\theta$-$\hat{\theta}$ which enables corrections to be made to the navigation system's estimate of the vehicle's own position. If range finding equipment is used the error signal becomes the difference between the actual measured range and the expected range.

It will be appreciated that alternative designs of bearing and/or range finding equipment can be utilised apart from the laser system described in order to provide the required error signal.

Figure 2:
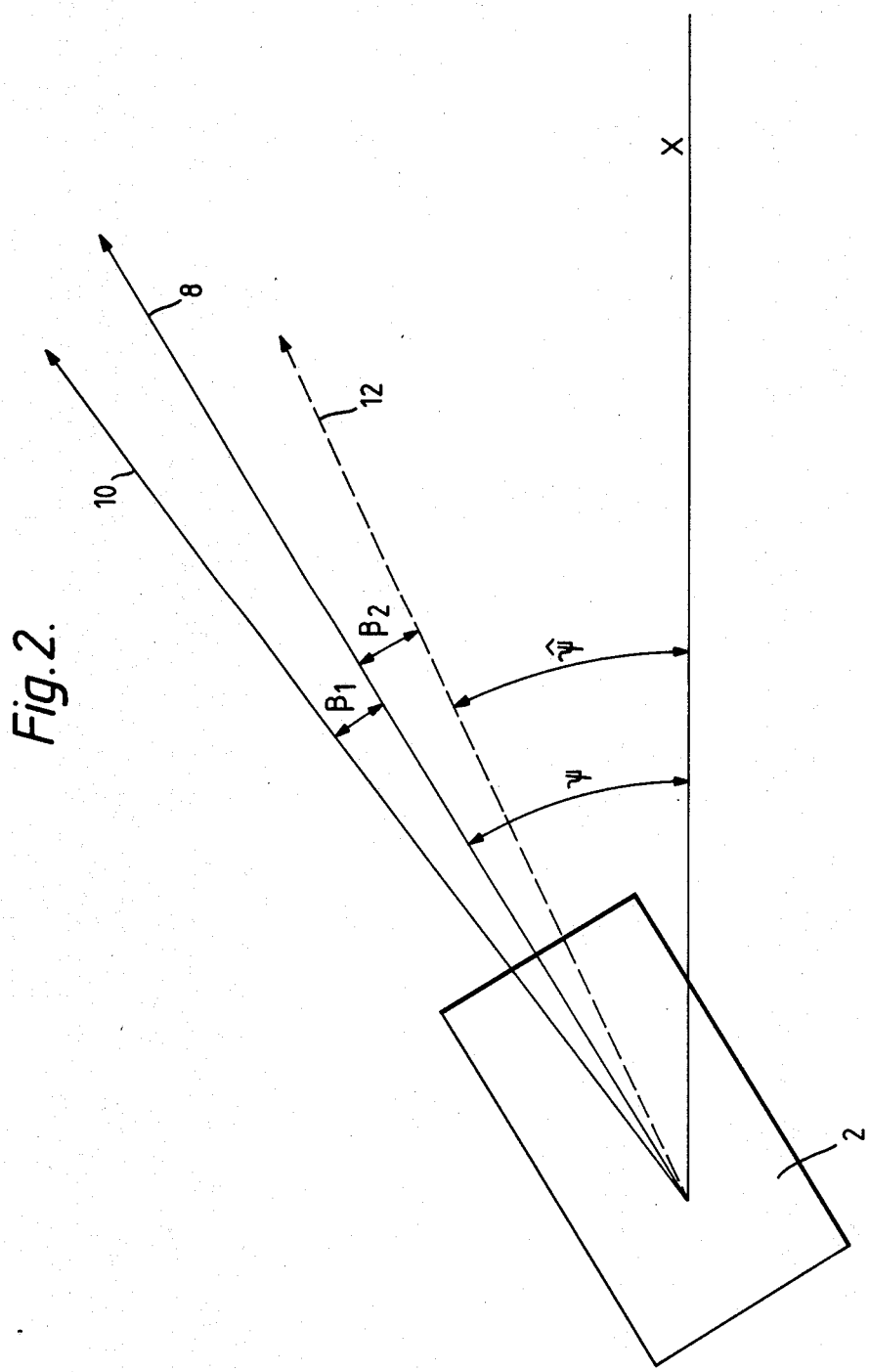
FIG. 2 is a diagram for explaining the crabbing angle.

FIG. 2 illustrates the two contributions to the "crabbing" angle of the vehicle 2. Due to mechanical misalignments or torque mismatches and the reaction of the vehicle with bumps in the floor surface the vehicle 2 exhibits a tendency to move in the direction of vector 10 rather than along the heading vector 8. The mechanical misalignments and torque mismatches produce a constant, though possibly drifting, value of $\beta_1$ between the vectors 8 and 10. The variations in $\beta_1$ due to the interaction between the castor wheel 6 and the floor surface produce a random noise disturbance which may be regarded as having a Gaussian distribution. The other contribution $\beta_2$ to the crabbing angle arises from the setting of the bearing finding equipment. The laser measures bearings with respect to a reference direction 12 within the vehicle frame. Ideally this reference direction 12 is aligned with the heading vector 8, however the reference direction may be shifted by an angle $\beta_2$ with respect to the heading direction. In the navigation system to be described the correction system will tend to produce an estimated value of the heading angle $\hat{\psi}$ which corresponds to the vector 12 rather than the vector 8. If the change in spatial position of the vehicle is calculated using this value of $\hat{\psi}$, errors will be introduced so that it is necessary to carry out the transformation using $\hat{\psi}+\beta$ to obtain the new spatial position of the vehicle correctly, where $\beta$ is, in this case, the sum of $\beta_1$ and $\beta_2$.

Figure 3:
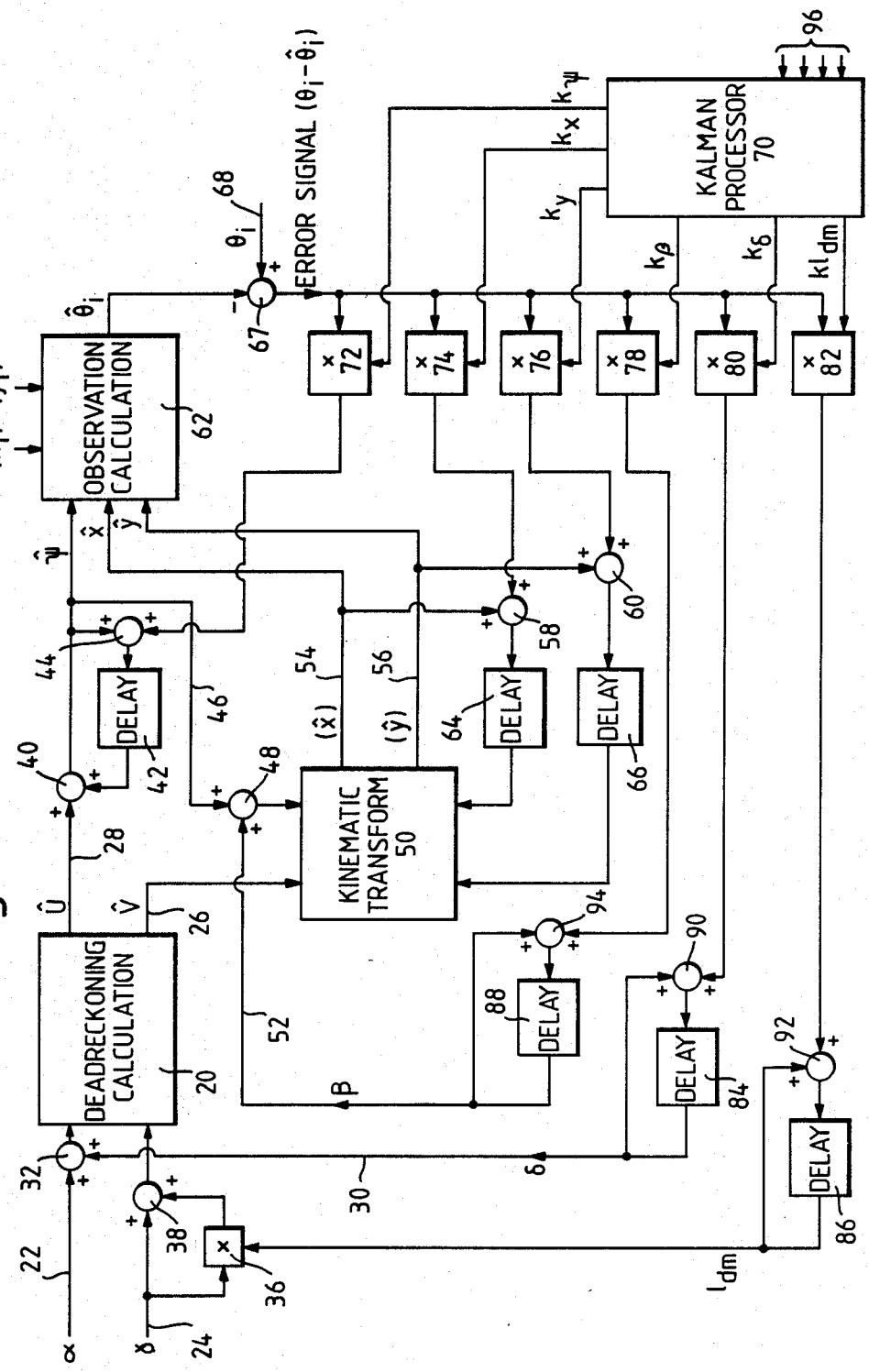
FIG. 3 is a block diagram for explaining the operation of the navigation system of the vehicle.

The vehicle navigation system will now be described with reference to FIG. 3.

The vehicle navigation system includes a dead reckoning position predictor 20 which updates the position of the vehicle after successive time intervals $\Delta t$ by means of input signals from sensors associated with the castor wheel 6. A typical value of $\Delta t$ is 60 ms. The sensors (not shown) detect the steering angle $\alpha$, the angle $\gamma$ through which the wheel rotates in each time interval, $\Delta t$ and provides these values as inputs 22 and 24 to the predictor 20. The angle sensors may, for example, be fixed magnetic or light sensors which co-operate with reference marks located around the periphery of the wheel 6 or on a mounting shaft of the wheel 6. The navigation system memory also contains a measurement of the radius $R_c$ of the castor wheel 6. This measurement is updated during operation of the navigation system in a manner to be described more fully later. The dead reckoning position predictor 20 utilises the inputs 22 and 24 from the sensors to calculate the linear distance V(t) moved in the direction of the heading vector and the amount of rotation U(t) of the vehicle about a vertical axis defined through the point P in the time interval, $\Delta t$ commencing at time t as outputs 26 and 28 respectively. The values of V(t) and U(t) in time $\Delta t$ are given as:

$$V(t) = R_c \gamma \cos\alpha \qquad 1$$

$$U(t) = \frac{R_c \gamma}{d} \sin\alpha$$

However, $R_c$ and $\alpha$ may be subject to drift errors. In the case of $R_c$ the radius of the steering wheel may have varied from the value stored in memory. In the case of $\alpha$ the measurement may be subject to a calibration error. Therefore correction parameters are introduced so that the radius of the wheel 6 becomes $R_c(1+1_{dm})$ and the actual steering angle becomes $\alpha+\delta$. Therefore equations 1 become:

$$V(t) = R_c(1 + l_{dm})\gamma\cos(\alpha + \delta) \qquad 2$$

$$U(t) = \frac{R_c}{d}(1 + l_{dm})\gamma\sin(\alpha + \delta)$$

There may also be calibration errors in the measurement of $\gamma$ but these can also effectively be taken account of by the parameter $l_{dm}$. The parameters $l_{dm}$ and $\delta$ are constantly updated by the control system in a manner to be described in more detail later. The current value of $\delta$ is fed on line 30 to an adder 32 to which the measured value of $\alpha$ is input on line 22. The output of the adder 32 is fed to the dead reckoning position predictor. The current value of $l_{dm}$ is fed along line 34 to a multiplier 36 which receives the measured value of $\delta$ as its other input on line 24. Input line 24 is also fed in parallel to one input of an adder 38 the output of which is fed to the dead reckoning position predictor 20. This input represents the factor $\delta(1+l_{dm})$ required in equations 2.

It is clear that the present heading of the vehicle at time $t+\Delta t$, $(t+\Delta t)$, is represented by:

$$\psi(t+\Delta t) = \psi(t) + U(t) \qquad 3a$$

Therefore $\psi(t+\Delta t)$ is produced by adding $U(t)$ to the value of $\psi(t)$ in an adder 40. The value of $\psi(t)$ is derived from the output of the adder 40 via a delay line 42.

The value of $\psi(t)$ is corrected when an error signal is available as a result of a target observation by the addition of a correction factor, $k_\psi$ times the error signal. The derivation of the gain $k_\psi$ will be described in more detail later. The addition is carried out in an adder 44 preceding the delay line. The present heading of the vehicle $\psi(t+\Delta t)$ is fed along line 46 via an adder 48 to a kinematic transform processor 50.

It will be assumed that the actual direction of movement of the vehicle is the estimated heading angle plus the crabbing angle designated by the parameter $\beta$. Thus the change in position of the vehicle reference point P will occur along a direction vector 10 at an angle $\psi+\beta$ plus independent white Gaussian noise vectors associated with both the calculated value of $\psi$ and the estimated drift error parameter $\beta$. The current estimate of $\beta$ is fed along line 52 to one input of adder 48 so that the input to the kinematic transform processor 50 represents $\psi+\beta$. The value of $V(t)$ on line 26 is fed directly to the kinematic transform processor 50.

The function of the kinematic transform processor 50 is to produce continually updated estimates of the position $(x,y)$ of the vehicle in the factory frame. The values of $x(t+\Delta t)$ and $y(t+\Delta t)$ are output on lines 54, 56 to adders 58 and 60 and also in parallel to an observation calculation processor 62.

At intervals the adders 58, 60 each add a respective correction factor, $k_x$ or $k_y$ times the error signal to the estimated value of $x(t+\Delta t)$ and $y(t+\Delta t)$. The output of each adder is passed through a respective delay line 64, 66 to provide corrected inputs of $x(t)$ and $y(t)$ to the kinematic transform processor 50.

The Kinematic transform processor calculates the updated estimates of $(x,y)$ from the input information as follows. It is clear that $$\dot{x} = V(t)\cos(\psi+\beta)$$

$$\dot{y} = V(t)\sin(\psi+\beta)$$

Integrating these equations over the time interval $t+\Delta t$ it can be shown that:

$$x(t+\Delta t) = \qquad 3b$$

$$x(t) + \frac{V(t)}{U(t)}[\sin(\psi(t+\Delta t) + \beta(t+\Delta t)) - \sin(\psi(t)+\beta(t))]$$

$$y(t+\Delta t) = \qquad 3c$$

$$y(t) - \frac{V(t)}{U(t)}[\cos(\psi(t+\Delta t) + \beta(t+\Delta t)) - \cos(\psi(t)+\beta(t))]$$

The value of $[\psi(t+\Delta t)+\beta(t+\Delta t)]$ is fed at time $t+\Delta t$ to the kinematic transform processor 50 as the output from adder 48. One previous value is stored for use as $\psi(t)+\beta(t)$ in calculating $x(t+\Delta t)$ and $y(t+\Delta t)$ from equations 3b and 3c above.

The values of $\psi$, x, y are fed to the observation calculation processor 62. The estimates of these values are updated every $\Delta t$ which is typically 60 ms. At longer, possibly irregular, intervals the laser bearing finding equipment produces a bearing $\theta_i$ on a target located at position $(x_i, y_i)$ in the factory frame. When a bearing is available the observation calculation processor 62 calculates the predicted bearing $\hat{\theta}_i$ from the estimated values of $\psi$, x, y and input data on the position $(x_i y_i)$ of the target on which the bearing is taken. The estimated bearing is fed to an inverted input of an adder 67. The other input 68 to the adder 67 is the actual bearing derived from the bearing finding equipment. The output of the adder 67 is an error signal representing the difference between the estimated and real bearings $\theta_i - \hat{\theta}_i$ which is fed to six multipliers 72 to 82. For a target at $x_i$ $y_i$ we can show that:

$$\tan(\theta_i(t+\Delta t) + \psi(t+\Delta t)) = \frac{y_i - y(t+\Delta t)}{x_i - x(t+\Delta t)}$$

Since the observed angle $\theta_i$ will be corrupted by random noise $\epsilon_{74}$, we can write $$\theta_i(t+\Delta t) = \tan^{-1}\left[\frac{y_i - y(t+\Delta t)}{x_i - x(t+\Delta t)}\right] - \psi(t+\Delta t) + \epsilon_\theta \qquad 4$$

The Kalman filter includes a processor 70 having six outputs each representing a Kalman gain factor for each of the parameters $\{\psi, x, y, \delta, l_{dm}, \beta\}$. Each factor is fed to a respective multiplier 72 to 82 in which it is multiplied with the error signal. The output product is fed to an adder in which it is added to the previous estimated of the associated parameter to correct it for the effect of errors which can be considered as white Gaussian noise. The adders 44, 58 and 60 for adding the correction factors to the estimates or $\psi$, x and y respectively have already been referred to above. Each of the parameters $\delta$, $l_{dm}$ and $\beta$ also have a similar arrangement of a delay line 84, 86, 88 and an adder 90, 92, 94 such that:

$$\delta(t+\Delta t) = \delta(t) + k_\delta \cdot (\theta_i - \hat{\theta}_i)$$

$$l_{dm}(t+\Delta t) = l_{dm}(t) + k_{l_{dm}} \cdot (\theta_i - \hat{\theta}_i)$$

$$\beta(t+\Delta t) = \beta(t) + k_\beta \cdot (\theta_i - \hat{\theta}_i)$$

The Kalman filter gains are preferably computed using the processor 70 which has a bank of inputs 96 representing the current estimates of all the parameters $\psi$, x, y, $\delta$, $1_{dm}$ and $\beta$. The Kalman filter programme utilises established filtering techniques for linear systems subject to random or write Gaussian noise. These techniques are described and derived in the text book "Optimization of Stochastic Systems" by M Aoki published by Academic Press 1967 to which reference may be made, in particular to pages 179 to 182. Although the present description refers exclusively to the Kalman filter algorithm it will be appreciated that other filtering algorithms may be used as appropriate to compute the necessary gains.

From the above discussion, we can write down a complete set of non-linear difference equations which describe the kinematics of the vehicle for the example give above and the evolution of the drift correction terms, as follows:

$$\psi(t + \Delta t) = \psi(t) + U(t) + \epsilon_\psi(t + \Delta t) \quad 5$$

$$x(t + \Delta t) = x(t) + f_x(\psi(t) + \beta(t), U(t), V(t)) + \epsilon_x(t + \Delta t)$$

$$y(t + \Delta t) = y(t) + f_y(\psi(t) + \beta(t), U(t), V(t)) + \epsilon_y(t + \Delta t)$$

$$V(t) = R_c \cdot \gamma(t) \cdot (1 + l_{dm}(t)) \cdot \cos(\alpha(t) + \delta(t))$$

$$U(t) = R_c \cdot \gamma(t) \cdot (1 + l_{dm}(t)) \cdot \sin(\alpha(t) + \delta(t))/d$$

$$\delta(t + \Delta t) = \delta(t) + \epsilon_\delta(t + \Delta t)$$

$$l_{dm}(t + \Delta t) = l_{dm}(t) + \epsilon_{l_{dm}}(t + \Delta t)$$

$$\beta(t + \Delta t) = \beta(t) + \epsilon_\beta(t + \Delta t)$$

Where in the above equations:

$$f_x(\psi, U, V) = V \cdot (\sin(\psi + U) - \sin(\psi))/U \quad 6$$

$$f_y(\psi, U, V) = -V \cdot (\cos(\psi + U) - \cos(\psi))/U$$

And $\epsilon_\psi$, $\epsilon_x$, and $\epsilon_y$ are random variables representing any disturbance of the vehicle motion due to, for example floor roughness. The drift parameters $\delta$, $1\,dm$ and $\beta$ are modelled as random walks where $\epsilon_\delta$, $\epsilon_{l_{dm}}$ and $\epsilon_\beta$ are random variables disturbing them.

At the position $\psi(t+\Delta t)$, $x(t+\Delta t)$, $y(t+\Delta t)$ the measured angle to the target 'i' is:

$$\theta_i(t+\Delta t) = \tan^{-1}\{(y_i - y(t+\Delta t))/(x_i - x(t+\Delta t))\} - \psi(t+\Delta t) + \epsilon_\theta(t+\Delta t) \quad 7$$

Where $x_i$, $y_i$ are the co-ordinates of target 'i' and $\epsilon_\theta$ is a random variable representing the error in the measuring device.

Given an estimate of the position and drift parameters of the vehicle at time t using all the data gathered up to time t:

$$\{\hat{\psi}(t|t), \hat{x}(t|t), \hat{y}(t|t), \hat{\delta}(t|t), \hat{l}_{dm}(t|t), \hat{\beta}(t|t)\}$$

The following definitions can be made of the variables in equations 5, 6 and 7:

$$\psi(t) = \hat{\psi}(t|t) + \Delta\psi(t)$$
$$x(t) = \hat{x}(t|t) + \Delta x(t)$$
$$y(t) = \hat{y}(t|t) + \Delta y(t)$$
$$\delta(t) = \hat{\delta}(t|t) + \Delta\delta(t)$$
$$l_{dm}(t) = \hat{l}_{dm}(t|t) + \Delta l_{dm}(t)$$
$$\beta(t) = \hat{\beta}(t|t) + \Delta\beta(t)$$

And:

$$\psi(t + \Delta t) = \hat{\psi}(t + \Delta t|t) + \Delta\psi(t + \Delta t)$$
$$x(t + \Delta t) = \hat{x}(t + \Delta t|t) + \Delta x(t + \Delta t)$$
$$y(t + \Delta t) = \hat{y}(t + \Delta t|t) + \Delta y(t + \Delta t)$$
$$\delta(t + \Delta t) = \hat{\delta}(t + \Delta t|t) + \Delta\delta(t + \Delta t)$$
$$l_{dm}(t + \Delta t) = \hat{l}_{dm}(t + \Delta t|t) + \Delta l_{dm}(t + \Delta t)$$
$$\beta(t + \Delta t) = \hat{\beta}(t + \Delta t|t) + \Delta\beta(t + \Delta t)$$

Where $\hat{\psi}(t+\Delta t|t)$ $\hat{x}(t+\Delta t|t)$ etc are estimates of the position and drift parameters of the vehicle at time $(t+\Delta t)$ using all the data gathered up to time t. They are computed in the dead reckoning position predictor 20 and kinematic transform processor 50 already described, in accordance with the following equations:

$$\hat{\psi}(t + \Delta t|t) = \hat{\psi}(t|t) + \hat{U}(t|t)$$
$$\hat{x}(t + \Delta t|t) = \hat{x}(t|t) + f_x(\hat{\psi}(t|t) + \hat{\beta}(t|t), \hat{U}(t|t), \hat{V}(t|t))$$
$$\hat{y}(t + \Delta t|t) = \hat{y}(t|t) + f_y(\hat{\psi}(t|t) + \hat{\beta}(t|t), \hat{U}(t|t), \hat{V}(t|t))$$
$$\hat{U}(t|t) = R_c \cdot \gamma(t) \cdot (1 + \hat{l}_{dm}(t|t)) \cdot \cos(\alpha(t) + \hat{\delta}(t|t))$$
$$\hat{V}(t|t) = R_c \cdot \gamma(t) \cdot (1 + \hat{l}_{dm}(t|t)) \cdot \sin(\alpha(t) + \hat{\delta}(t|t))/d$$
$$\hat{\delta}(t + \Delta t|t) = \hat{\delta}(t|t)$$
$$\hat{l}_{dm}(t + \Delta t|t) = \hat{l}_{dm}(t|t)$$
$$\hat{\beta}(t + \Delta t|t) = \hat{\beta}(t|t)$$

The above estimates can be used to compute the best estimate of the angle to target 'i' at time $(t+\Delta t)$ thus:

$$\hat{\theta}_i(t+\Delta t|t) = \tan^{-1}\{(y_i - \hat{y}(t+\Delta t|t))/(x_i - \hat{x}(t+\Delta t|t))\} - \hat{\psi}(t+\Delta t|t)$$

Equations 5, 6 and 7 can be expanded by Taylor series about $\hat{\psi}(t|t)$, $\hat{x}(t|t)$, etc and $\hat{\psi}(t+\Delta t|t)$, $\hat{x}(t+\Delta t|t)$ etc and thus, by neglecting higher order terms can be expressed in the linear form:

$$\Delta z(t+\Delta t) = A_t \Delta z(t) + \epsilon_z, \Delta\theta(t+\Delta t) = H_{t+\Delta t} \Delta z(t+\Delta t) + \epsilon_\theta. \quad 8$$

Where the vector $$\Delta z(t) = \{\Delta\psi(t), \Delta x(t), \Delta y(t), \Delta\delta(t), \Delta l_{dm}(t), \Delta\beta(t)\}$$

and the measured error signal $$\Delta\theta(t+\Delta t) = \theta_i(t+\Delta t) - \hat{\theta}_i(t+\Delta t|t)$$

$\epsilon_z$ is the vector of random variables $\epsilon_{104}$, $\epsilon_x$, etc.

The matrix $A_t$ is derived by computing the derivatives of the function in the equations 5, 6 and 7, at the point $\hat{\psi}(t|t)$, $\hat{x}(t|t)$, etc. Thus, symbolically:

$$A_t = \begin{bmatrix} 1 & 0 & 0 & \frac{\partial U}{\partial \delta} & \frac{\partial U}{\partial l} & 0 \\ \frac{\partial f_x}{\partial \psi} & 1 & 0 & \frac{\partial x}{\partial \delta} & \frac{\partial x}{\partial l_{dm}} & \frac{\partial f_x}{\partial \psi} \\ \frac{\partial f_y}{\partial \psi} & 0 & 1 & \frac{\partial y}{\partial \delta} & \frac{\partial y}{\partial l_{dm}} & \frac{\partial f_y}{\partial \psi} \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

Where:

$$\frac{\partial f_x}{\partial \delta} = \frac{\partial f_x}{\partial U} \cdot \frac{\partial U}{\partial \delta} + \frac{\partial f_x}{\partial V} \cdot \frac{\partial V}{\partial \delta} \text{ etc.}$$

and the observation vector is:

$$H_{t+\Delta t} = \begin{bmatrix} \frac{\partial \theta}{\partial \psi}, & \frac{\partial \theta}{\partial x}, & \frac{\partial \theta}{\partial y}, & 0, 0, 0 \end{bmatrix}$$

The linearised equation 8 may be used to compute the vector of Kalman gains $\{k_\psi, k_x, k_y, k_\delta, k_{l_{dm}}, k_\beta\}$ using the algorithm defined by H. Aoki "Optimization of Stochastic Systems" pages 179 to 182. The algorithm requires the statistics of the random variables vector $\epsilon_z$ and measurement error $\epsilon_\theta$ to be specified. A suitable form is to assume zero mean, normally distributed random variables with variances defined as follows:

$$E\{\epsilon_z \cdot \epsilon_z'\} = C_t \cdot Q \cdot C_t'; E\{\epsilon_\theta^2\} = R$$

Where Q is a diagonal matrix of covariances and $C_t$ is a rotation matrix. Typically, the matrix $C_t$ rotates the random disturbances in the x and y co-ordinates to align with the vehicle heading:

$$C_t = \begin{bmatrix} 1 & 0 & 0 & 0 & 0 & 0 \\ 0 & \cos(\hat{\psi}(t|t)) & -\sin\hat{\psi}(t|t) & 0 & 0 & 0 \\ 0 & \sin(\hat{\psi}(t|t)) & \cos(\hat{\psi}(t|t)) & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

The algorithm for computing the Kalman gains is recursive in nature (see Aoki) and requires an initial covariance matrix for the estimates:

$$E\{\Delta z(0) \cdot \Delta z'(0)\} = G_0$$

A suitable initial choice for this matrix is diagonal in form with diagonal elements of sufficient magnitude to represent the initial lack of knowledge of the position of the vehicle and the drift correction terms.

The programme implemented by the computer 70 is designed such that every time an observation is taken the matrices $A_t$ and $C_t$ are computed. Then an "a priori" covariance matrix P is calculated as follows $$P = A_t G A_t' + C_t Q C_t'$$

Where G is the "a postiori" covariance matrix from the previous observation. If this is the first observation $G_0$ is used.

The observation calculation processor 62 produces the predicted angle $\hat{\theta}_i$ and the adder 67 outputs the error signal to the multipliers. If the error signal is below a predetermined threshold the observation matrix $H_{t+\Delta t}$ is computed. Then the Kalman gain factors are computed from the relation $$K_{t+\Delta t} = \begin{bmatrix} k_\psi \\ k_x \\ k_y \\ k_\delta \\ k_{l_{dm}} \\ k_\beta \end{bmatrix} = PH_{t+\Delta t}(H_{t+\Delta t} PH_{t+\Delta t} + R_{t+\Delta t})^{-1}$$

These values of the Kalman gain factors are used to correct the estimated values of $\hat{\psi}(t+\Delta t)$, $\hat{x}(t+\Delta t)$, $\hat{y}(t+\Delta t)$, $\hat{\delta}(t+\Delta t)$ $\hat{l}_{dm}(t+\Delta t)$ and $\hat{\beta}(t+\Delta t)$ by means of the multipliers 72 to 82 and adders 44, 58, 60, 90, 92, and 94 respectively as described previously.

The "a postiori" covariance matrix G is updated as $$G = P - K_{t+\Delta t} H_{t+\Delta t} P$$

for usse when the next observation is taken.

If the error signal from the processor 62 is above a threshold the Kalman gain factors are not calculated by the computer 70. The new value of G becomes the last value of P. Therefore the corrected estimates remain as the original estimates produced by the dead reckoning position predictor and the kinematic transform processor and the values of the parameters $\delta$, $l_{dm}$ and $\beta$ remain the same. The threshold may be recalculated from time to time depending on factors such as the time for which the vehicle has been running which gives an indication of how large an error signal is probable. By using a threshold, obviously wrong error signals caused, for example, by the bearing being from a different target than that for which the expected bearing has been calculated, or spurious laser reflections from things other than targets, can be discarded in order to prevent large and unnecessary course corrections being made.

Various techniques may be used to simplify the matrix manipulations required to be performed by the computer 70. By taking advantage of certain symmetries, the fact that many of the matrices contain several zero terms and by writing the matrix A as the sum of the identity matrix plus a matrix with only off-diagonal terms, the number of multiplications and additions can be reduced to a manageable value to allow the processing to be carried out in real time.

It will be appreciated that any suitable co-ordinate system may be used in place of the x, y cartesian system described. This will have an effect on the equations representing the kinematics of the vehicle but will not alter the underlying principles. Similarily design variations to the steering arrangements of the vehicle or the measurement of the motion during each time interval will modify the terms of the kinematic equations. It will be appreciated that for any appropriate design of vehicle and definition of parameters, a system of kinematic equations that can be linearised as above and used in a filtering algorithm, may be set up.

What is claimed is:

1. A navigation system for a wheeled vehicle having steering means and means for controlling the steering means in response to a stored program, said vehicle in operation having a heading angle and a spatial position within a predetermined coordinate frame of reference, and a bearing and a range to a target at a known predetermined position within said frame of reference, said navigation system comprising:
   (a) means for determining a linear distance traveled by the vehicle and an amount of rotation of the vehicle about a predetermined center of rotation during each of a plurality of successive time intervals;
   (b) means coupled to said determining means for producing, in response to said linear distance and said amount of rotation determined during each said time interval, updated estimates of said heading angle and said spatial position of the vehicle within said predetermined coordinate frame of reference;
   (c) means coupled to said updated estimate producing means for determining at least one of said bearing and said range to a target at a known predetermined position within said reference frame, and for deriving an error signal as a difference between an actual measured respective one of said bearing and said range and a respective one of said bearing and said range that should have been measured if the vehicle was actually at the estimated position with the estimated heading; and
   (d) filter means responsive to said error signal for producing corrected estimated values of said heading angle and of said spatial position of said vehicle and also for producing a corrected estimated value of at least one further parameter of said vehicle for substantially continuously calibrating a respective one of said means (a), (b) and (c).

2. A system as claimed in claim 1, wherein the further parameter comprises an angular offset error in the measurement of a steering angle.

3. A system as estimated in claim 1, wherein the further parameter comprises a "crabbing" angle representing an offset between the actual direction of movement and the heading of the vehicle.

4. A system as claimed in claim 1, wherein the further parameter comprises an error in the measurement of the radius of a wheel which steers the vehicle.

5. A system as claimed in claim 1, wherein the filter means is operable not to produce corrected values of the parameters when the error signal exceeds a predetermined threshold.

6. A system as claimed in claim 1, wherein the filter means uses a Kalman filter algorithm.

7. A method as claimed in claim 8, wherein the filtering step comprises producing a correction factor for each parameter using a Kalman filter algorithm, multiplying each correction factor by the error signal and adding the product to the previous estimate of that parameter to produce a corrected estimate.

8. A method of controlling an automated wheeled vehicle, comprising the steps of:
   (a) sensing a linear and angular displacement of the vehicle in each of a plurality of successive time intervals;
   (b) updating estimates of a current position and heading of the vehicle after each said successive time interval in response to the sensed linear and angular displacements;
   (c) taking at least one of a bearing and a range from the vehicle to a target at a known position;
   (d) calculating from the estimated position and heading of the vehile at least one of an expected range to said target and an expected bearing to said target at the time at which it is taken;
   (e) deriving an error signal as a difference between respective ones of the expected and measured ranges and bearings;
   (f) filtering the error signal to produce corrected estimates of the position and heading and of at least one further parameter used in at least one of the steps (a) and (b) which is subject to an error; and
   (g) using said at least one further parameter to substantially continuously correct a respective one of steps (a), (b), (c) and (d).

9. A navigation system for a wheeled vehicle having steering means and means for controlling the steering means in response to a stored program, said vehicle in operation having a heading angle and a spatial position within a predetermined coordinate frame of reference, and a bearing and a range to a target at a known predetermined position within said frame of reference, said navigation system comprising:
   (a) means for determining a linear distance traveled by the vehicle and an amount of rotation of the vehicle about a predetermined center of rotation during each of a plurality of successive time intervals;
   (b) means coupled to said determining means for producing, in response to said linear distance and said amount of rotation determined during each said time interval, updated estimates of said heading angle and said spatial position of the vehicle within said predetermined coordinate frame of reference;
   (c) means for measuring at least one polar coordinate in relation to the vehicle of said target, and for deriving an error signal as the difference between an actual measured coordinate and a coordinate that should have been measured if the vehicle was actually at the estimated position with the estimated heading; and
   (d) filter means responsive to said error signal for producing corrected estimated values of said heading angle and of said spatial position of said vehicle and also for producing a corrected estimated value of at least one further parameter of said vehicle for substantially continuously calibrating a respective one of said means (a), (b) and (c).

* * * * *